United States Patent [19]

Beasley

[11] 4,113,909
[45] Sep. 12, 1978

[54] METHOD FOR FORMING EXPANDED PANELS FROM THERMOFORMABLE MATERIAL AND THE RESULTANT PRODUCT

[75] Inventor: Donald R. Beasley, Bronxville, N.Y.

[73] Assignee: Norfield Corporation, Danbury, Conn.

[21] Appl. No.: 763,097

[22] Filed: Jan. 27, 1977

[51] Int. Cl.² .................... B29C 17/02; B32B 3/12
[52] U.S. Cl. .................................. 428/116; 100/295;
100/DIG. 18; 264/164; 264/275; 425/445
[58] Field of Search ............... 264/164, 275; 100/295,
100/DIG. 18; 428/116; 425/445

[56] References Cited

U.S. PATENT DOCUMENTS

| 2,502,304 | 3/1950 | Baker .................................. 264/164 |
| 2,820,250 | 1/1958 | Stratton ........................... 100/295 X |
| 3,109,476 | 11/1963 | Giordano ......................... 100/295 X |
| 3,134,350 | 5/1964 | Danly et al. ................. 100/DIG. 18 |
| 3,249,041 | 5/1966 | Johnson ........................... 100/295 X |
| 3,463,080 | 8/1966 | Rodriguez et al. .............. 100/295 X |
| 3,524,785 | 8/1970 | Feiglin .............................. 100/295 X |
| 3,919,378 | 11/1975 | Smarook ............................ 264/164 |
| 3,919,380 | 11/1975 | Smarook et al. ................. 264/275 X |
| 3,919,445 | 11/1975 | Smarook ........................... 264/275 X |

FOREIGN PATENT DOCUMENTS

| 110,422 | 4/1940 | Australia ................................ 100/295 |
| 341,707 | 1/1931 | United Kingdom ..................... 100/295 |

OTHER PUBLICATIONS

Swindells, James F. "Calibration of Liquid-in-Glass Thermometers," U.S. Dept. Commerce, National Bureau of Standards monograph 90, issued Feb. 12, 1965, pp. 6 and 7.

Primary Examiner—Philip Anderson
Attorney, Agent, or Firm—Kenyon & Kenyon, Reilly, Carr & Chapin

[57] ABSTRACT

In order to make large panels of expanded thermoformable material in a process in which a blank of the material is placed between two heated mold plates, the blank adhered to the plates by hot tack adhesion; the plates separated and the expanded material cooled, while maintaining commercial tolerances, the mold plates are supported on elongated mounting studs.

4 Claims, 3 Drawing Figures

METHOD FOR FORMING EXPANDED PANELS FROM THERMOFORMABLE MATERIAL AND THE RESULTANT PRODUCT

BACKGROUND OF THE INVENTION

This invention relates to processes in which a plate or press must be held in a fixed position during a wide range of thermal cycling such as in the production of expanded thermoformable materials and products in general and more particularly to an improved method and apparatus for maintaining a press or plate so fixed. With respect to producing thermoformable products, it permits producing larger panels of such materials than was heretofore possible.

In general terms, an important type of process and apparatus to which the present invention relates is that disclosed in a series of U.S. Pat. Nos. 3,919,445; 3,919,380; 3,919,381 and 3,919,378, all issued Nov. 11, 1975 to Walter H. Smarook. Basically, as disclosed in U.S. Pat. No. 3,919,445 the process is one in which a blank of thermoplastic polymeric material is placed between two molds of a heated press. The temperature of the mold plates is about 5 to 10° C. above the temperature at which the thermoplastic material exhibits hot tack adhesion. The mold plates are separated apart and the adhesive forces of the polymeric material to the mold paltes are greater than the cohesive flow properties of the polymeric material itself during the plate separation or expansion step. Thus, it is possible to mechanically move the mold plates a certain distance apart with the polymeric material bonded to the surfaces thereof without causing a rupture of the adhesion between the surfaces and the fused material. The plates are separated causing the panel to take on a new internal geometry and the plates then cooled to solidify the expanded panel. During the process it is mandatory that the plate surfaces be parallel to each other within a few thousands of an inch, first during the melting stage, or else the plastic adhesion will not become accomplished, and finally, during the cooling state, or else the final pattern will not meet commercial standards of thickness uniformity. Typically, temperature cycling can range between 60° and 700° F.; a more common range being from 100° to 400° F. Thus, a fundamental problem in this process is that the metal mold plates, when subjected to temperature changes, also undergo dimensional changes and, when fixed to a supporting frame which is, of course, necessary they tend to bend so as to lose their parallelism. In addition, buckling of the supporting frame can also occur. Most developmental work in these processes described in aforementioned patents was done on 6 inch squares. Maintaining parallelism with such a small size is not particularly difficult. However, attempts to make larger size panels, up until the time of the present invention, have not been particularly successful. Even panels in a size as small as 14 × 24 inches have proven problematic. There is, however, a need for larger panels, for example, panels of sizes up to and larger than 4 × 10 feet. For example, such panels can be used as floating roof covers in chemical and protroleum tanks to reduce pollution and evaporation loss. There are, of course, many other applications for such panels, some of which require high tolerances, particularly where a plurality of panels are bonded or fitted together, e.g. office partitions and desk tops.

Thus, it can be seen that there is a need for an improved method for carrying out an expansion process with thermoformable material so as to produce larger size products, such as panels, which are commerically acceptable.

In general terms, there is a need for a method for holding large presses or plates fixed during thermal cycling.

SUMMARY OF THE INVENTION

The present invention provides a solution to this problem. Deviating from the previous manner of mounting in which I beams were mounted directly to the parallel press platens of the press machine used to move the molds apart and together, an arrangement which permits relative movement between the machine and the mold is used in the method and apparatus of the present invention. In accordance with the present invention, each of the molds is connected to the machine frame utilizing a plurality of elongated mounting studs. It has been discovered that when making thermoformable panels of a size of 4 × 10 feet, a length of these mounting studs greater than twelve inches is necessary in order to obtain molded panels which meet tolerence requirements and to achieve repeatability.

The construction of the present invention avoids problems found in other mounting arrangements. For example, a mounting arrangement in which the mounting of the molds was made directly to I beams which were in turn directly mounted to the machine frame with the mold mounting bolts disposed so as to permit free sliding movement was found to be completely unsatisfactory resulting in a bowing which caused a three-sixteenths deviation between the ends and the middle. This is thought to be the result of the bolts not sliding freely and heat from the mold warping the I beams and machine frame. Even attempts at improving the sliding of the mounting bolts through the use of Teflon washers and insulating the mold from the I beams with suitable insulators does not give effective results. Although such steps will result in improvement, it is still difficult to obtain panel repeatability which meets commercial standards. Furthermore, even the use of mounting bolts of the type used in the present invention which are 12 inches long or shorter will not permit repeatably satisfactory results when making panels which have a size of 4 × 10 feet. Only when the mounting bolt length is increased above 12 inches, for example, 16 inches, can tolerences be maintained in this size of panel. With 16 inch mounting studs, thickness deviation has been reduced to 10 mils with the apparatus and process of the present invention.

With the mold mounting of the present invention, utilizing 16 inch studs, thermal effects on the frame are reduced to insignificance. The predominant distortion effect is the horizontal movement of the mounting studs. Typically, with a horizontal mold plate and a 300° temperature difference there will be a change in length of approximately 0.23 inches on each side. The effect of this horizontal change on the vertical position has been calculated to be approximately 1.6 mils for each mold plate or a total of 3.2 mils. This is consistent with measurements made on actual molded panels and is well within the tolerences required for commercial grade panels.

DETAILED DESCRIPTION OF THE INVENTION

Figure 1:
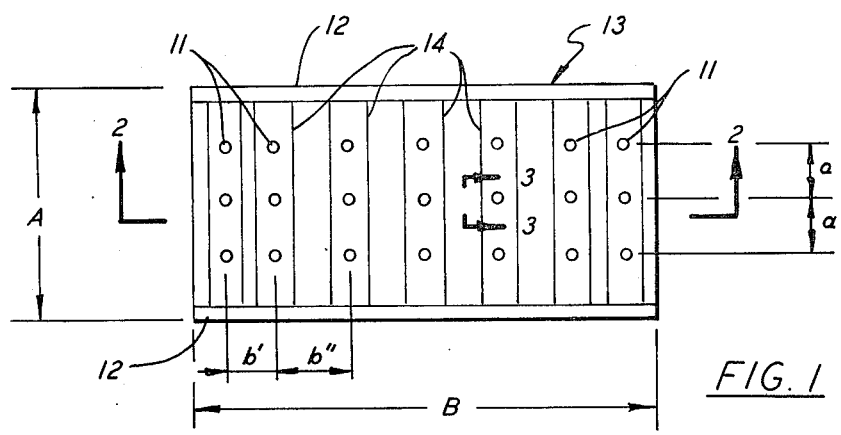
FIG. 1 is a plan view of a portion of the machine platen illustrating the location of the mounting studs.
Figure 2:
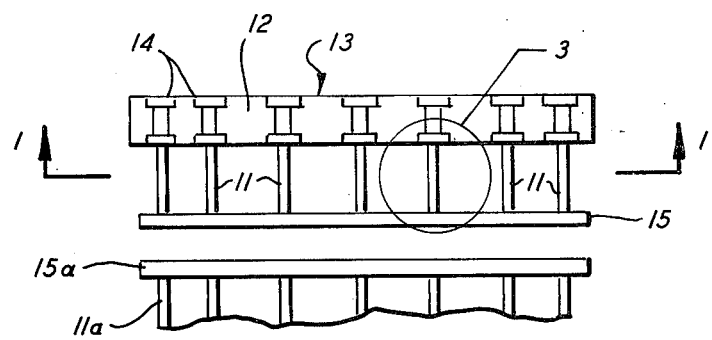
FIG. 2 is a side view of the arrangement of FIG. 1 also showing the mold plate attached to the machine platen.
Figure 3:
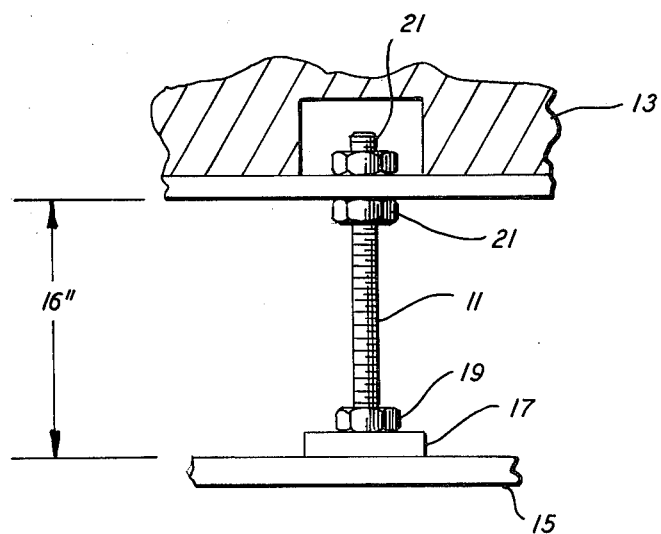
FIG. 3 is a detail of FIG. 2 illustrating in more detail the mounting arrangement.

FIGS. 1 and 2 illustrate the general arrangement of the apparatus of the present invention. FIG. 1 is a view of the attachment of the mounting studs 11 of the present invention to the machine frame platen 13, more specifically the upper platen 13 of the machine frame. The machine frame platen illustrated comprises two 8 inch steel channels 12 with transverse 8 inch steel I beams 14 disposed therebetween. As illustrated, three rows of mounting bolts are used. With the exception of those on the ends, the mounting bolts have equal spacing in the horizontal direction equal to $b''$. At the ends there is only a spacing of $b'$ between mounting studs. The three rows of mounting studs 11 are separated from each other by a distance designated $a$. Typically, for a 4 × 10 panel, i.e. where the dimension A is 4 feet and the dimension B 10 feet, the distance $a$ will be 17 inches with the middle row of mounting studs 11 on the center line, the distance $b'$ will be 8 inches and the distance $b''$ 13 inches. FIG. 2 illustrates the machine platen 13 once again along with the mounting studs 11 and, at the end of the mounting studs 11, the mold plate 15. Shown also is a portion of the bottom mold plate 15a which is attached with similar bolts 11a to the opposing machine frame platen (not shown). Finally, FIG. 3 illustrates in more detail the attachment of the mold 15 to the machine frame 13. As illustrated, each mounting stud 11, which may be a ⅜-11 threaded rod is attached to a threaded block 17 which is welded or otherwise fastened to the mold plate with a lock nut 19 used to secure the threaded rod 11 in place. The threaded rod is passed through a suitable hole in the machine platen 13 with an opening provided thereabove so that lock nuts 21 can be fastened on opposing sides of the machine frame. The distance between the bottom of the machine frame 13 and the top of the mold plate 15, indicated as the distance C on the figure, when molding plates which are 4 by 10 feet should be at least 16 inches. In general terms, the amount of thermal expansion X of a plate in either direction as measured from the center line would be equal to B/2 times the coefficient of thermal expansion times $\Delta t$, where $\Delta t$ is the temperature change. For a 4 × 10 foot panel the equation becomes $X = 60$ in. $\times 13 \times 10^{-6}$ in/in/° F. $\times 300°$ F. $= 0.23$ inches. The change D in vertical dimensions because of such a horizontal expansion will be equal to $C - \sqrt{C^2 - X^2}$. In the present example, $C$ is equal to 16 inches and X equals 0.23 inches. Solving for the above equation results in the vertical distance $D$ being equal to 1.6 mils. In general terms, when panels of a different size are being made, the length of the bolts should selected to satisfy the quation $D = C - \sqrt{C^2 - X^2}$ where $D$ equals one-half the maximum deviation permissable in panel thickness, (since there are two molds, each will make a contriubtion to the thickness deviation), $C$ the length of the bolts and $X$ the amount of thermal expansion in one half of the mold based on the mold material used and the temperature differential to be employed.

Although the present invention has been disclosed in connection with a process for thermoformable materials, it will be recognized by those skilled in the art that it is generally applicable to any process where a plate or press must be held fixed such as in reaction injection molding (RIM).

I claim:

1. In a process for expanding the cross-section of a blank of thermoformable material while in a thermoformable state by steps comprising positioning the material between two mold plates while said material in a thermoformable state and heated to a temperature at which it will adhesively bond to the mold plates, adhesively bonding the material by hot tack adhesion to each of the two mold plates, pulling the mold plates apart while the material is so bonded and in a thermoformable state and cooling the expanded material to a temperature below the heat distortion point of the material, the improvement comprising providing supports for each of the two mold plates being supported only on a plurality of elongated studs arranged in rows and columns distributed over the area of each mold plate and essentially perpendicular thereto whereby bending of said plates is avoided, the studs having a length such as to satisfy the following equation: $D = C - \sqrt{C^2 - X^2}$ where $D$ equals one-half the maximum deviation permissible in panel thickness, $C$ the length of the studs and $X$ the amount of thermal expansion in one half of the mold based on the mold material used and the temperature differential to be employed.

2. The process according to claim 1 wherein the material to be processed has a size of approximately 4 feet by 10 feet and wherein the length of said studs is 16 inches.

3. The product produced by the process of claim 1.

4. In a process in which a flat planar member such as a press or plate must be held in a fixed position during thermal cycling through large ranges, a method of avoiding bending of the member due to the thermal cycling comprising supporting the member only on a plurality of elongated studs arranged in rows and columns distributed over the area of the member and essentially perpendicular thereto, the studs having a length such as to satisfy the following equation: $D = C - \sqrt{C^2 - X^2}$ where $D$ equals the maximum deviation permissible in bending of the member, $C$ the length of the studs and $X$ the amount of thermal expansion in the member based on the material used therein and the temperature differential to be employed.

* * * * *